March 6, 1962 R. TEMPLE ETAL 3,023,498
PARACHUTE HARNESS STRAP CUTTER
Filed July 25, 1960 4 Sheets-Sheet 1
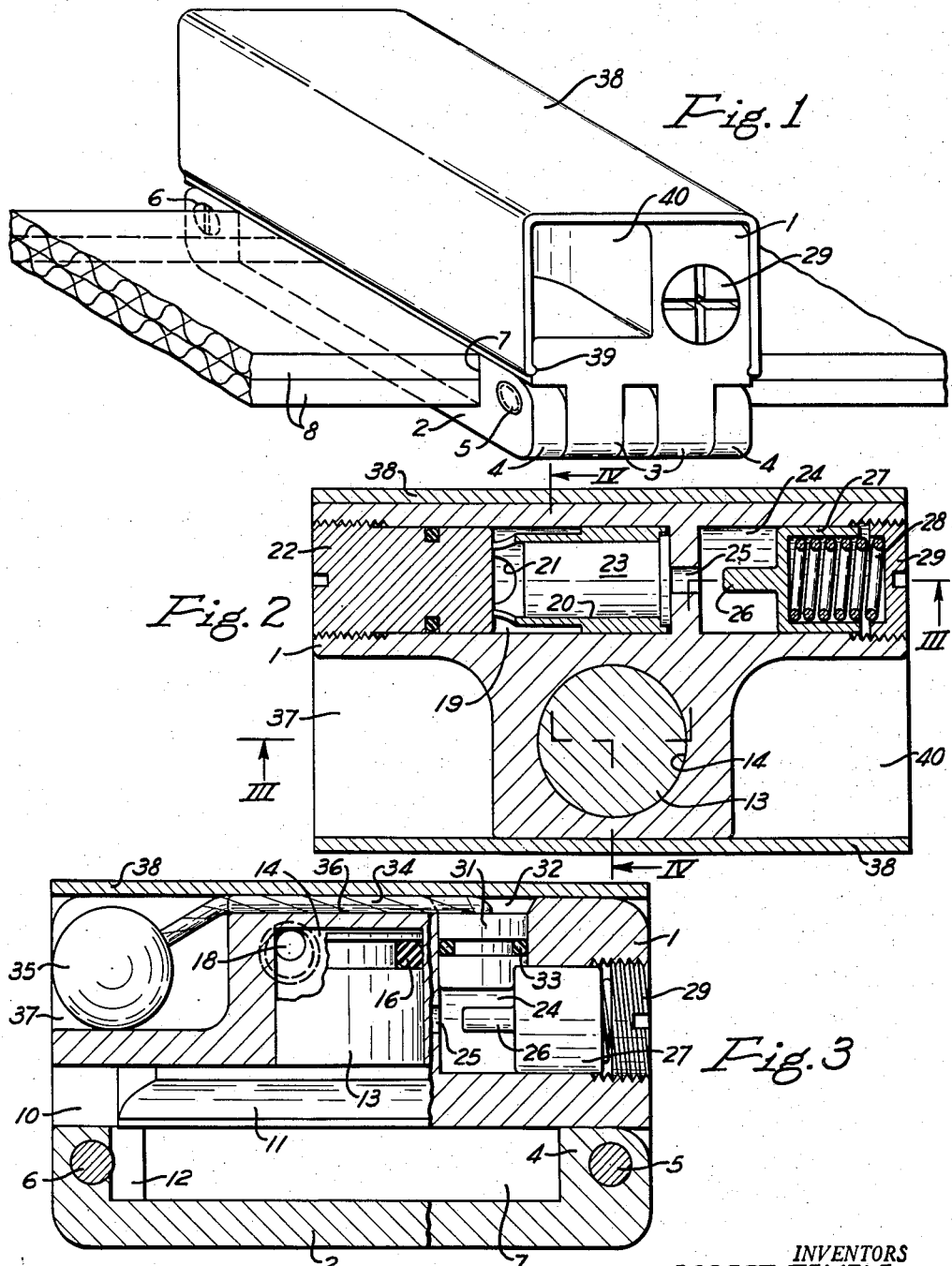
INVENTORS
ROBERT TEMPLE
ERNEST E. TEMPLE
BY
THEIR ATTORNEYS

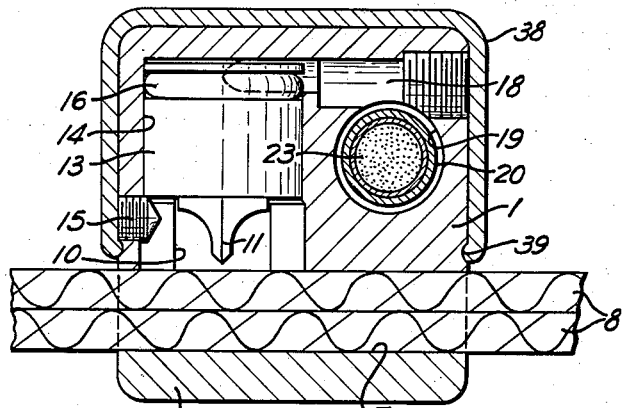
Fig. 4
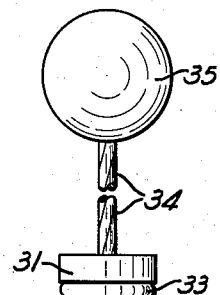
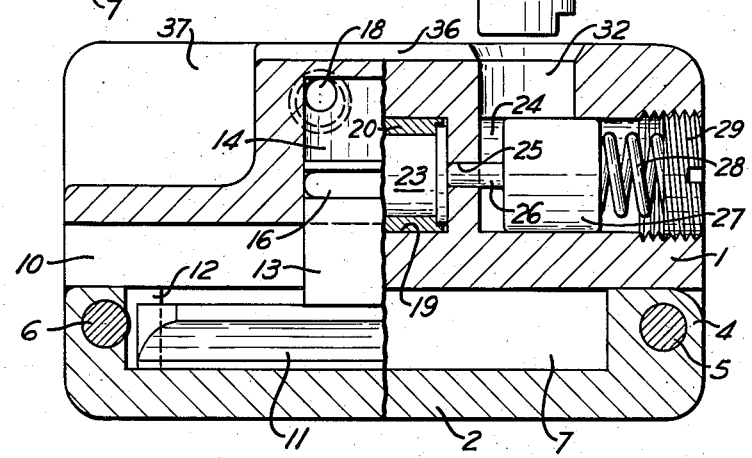
Fig. 5

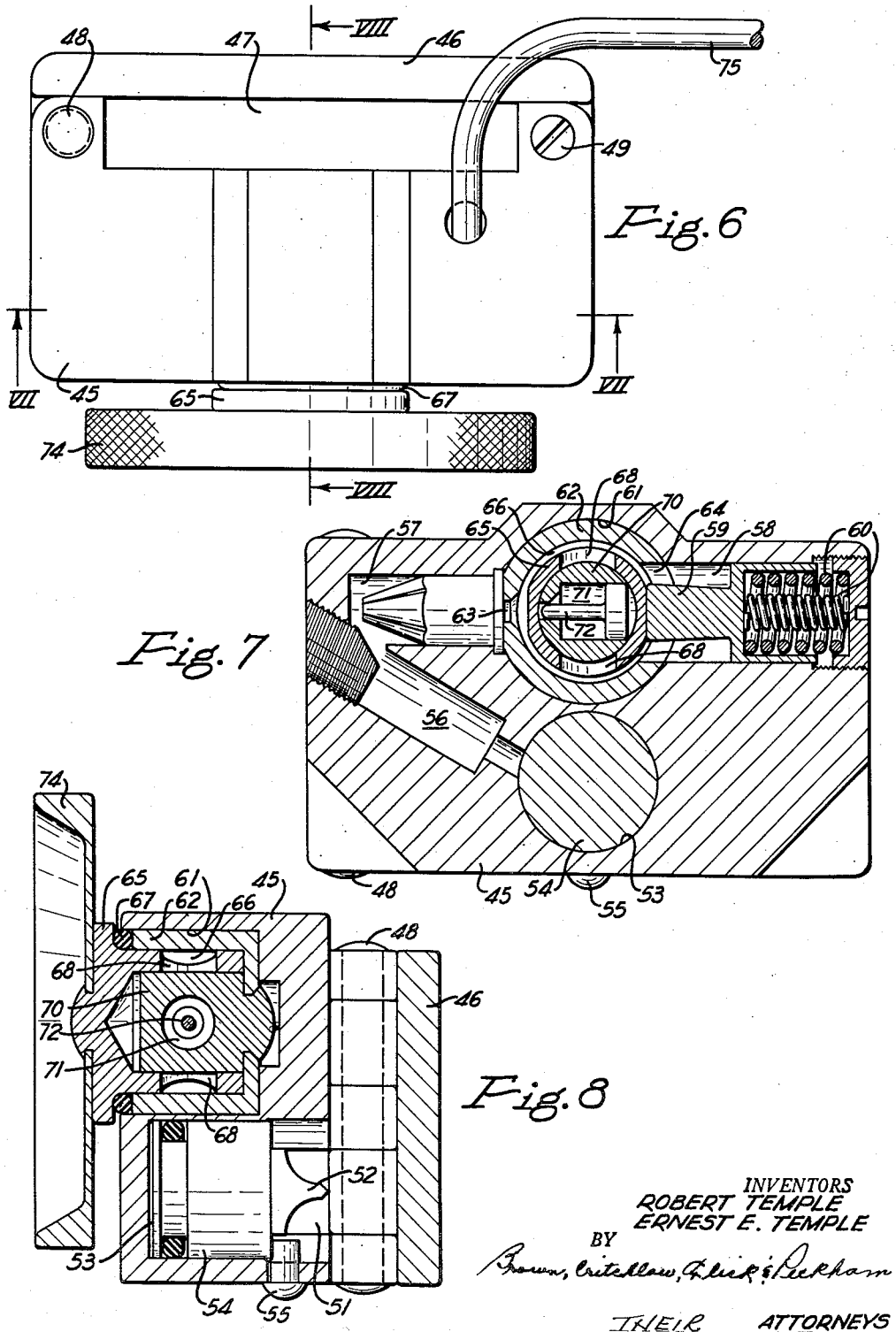

March 6, 1962

R. TEMPLE ETAL 3,023,498

PARACHUTE HARNESS STRAP CUTTER

Filed July 25, 1960

INVENTORS
ROBERT TEMPLE
ERNEST E. TEMPLE
BY

THEIR ATTORNEYS

3,023,498
PARACHUTE HARNESS STRAP CUTTER
Robert Temple, Swissvale, and Ernest E. Temple, Murraysville, Pa., assignors to Mine Safety Appliances Company, a corporation of Pennsylvania
Filed July 25, 1960, Ser. No. 44,994
7 Claims. (Cl. 30—180)

This invention relates to explosively actuated cutting devices, and more particularly to such devices for use in cutting parachute harness straps in emergencies.

If there is a strong wind blowing when a parachutist reaches the ground, he may be dragged by the parachute for a considerable distance and seriously injured or killed. This can happen because the wind pressure against the parachute produces so much tension on his body harness that the usual release mechanism will not function to separate the parachute from him.

It is among the objects of this invention to provide a device to be worn by a parachutist which can be operated by him to cut a parachute harness strap in an emergency, which is compact and light-weight, which is dependable in operation, and which requires extremely little manual effort to operate it.

In accordance with this invention a frame has a slot through it for receiving a parachute harness strap. One wall of the slot is provided with a recess that receives a cutting blade which extends across one side of the slot. The frame is also provided with a chamber behind the recess and having an open end communicating with the recess. Inside the recess there is a piston for driving the blade across the slot and against its opposite wall. The frame also is provided with a cartridge chamber and with a passage connecting that chamber with the piston chamber at the inner end of the piston. Slidably mounted in the frame behind the cartridge chamber is a firing pin that can be driven ahead toward the cartridge chamber by spring-actuated means located behind it. Such means normally is maintained in retracted position by manually removable means which, when removed, will permit the spring-actuated means to drive the firing pin.

The invention is illustrated in the accompanying drawings, in which—

FIG. 1 is a perspective view of our cutter mounted on a pair of straps;

FIG. 2 is a longitudinal section parallel to the straps;

FIG. 3 is a longitudinal section taken on the line III—III of FIG. 2;

FIG. 4 is a transverse section taken on the line IV—IV of FIG. 2;

FIG. 5 is a view similar to FIG. 3, but showing the device after it has been fired;

FIG. 6 is a view of one side of a modification of this invention;

FIG. 7 is a longitudinal section taken on the line VII—VII of FIG. 6;

FIG. 8 is a transverse section taken on the line VIII—VII of FG. 6; and

Figures 9, 10:
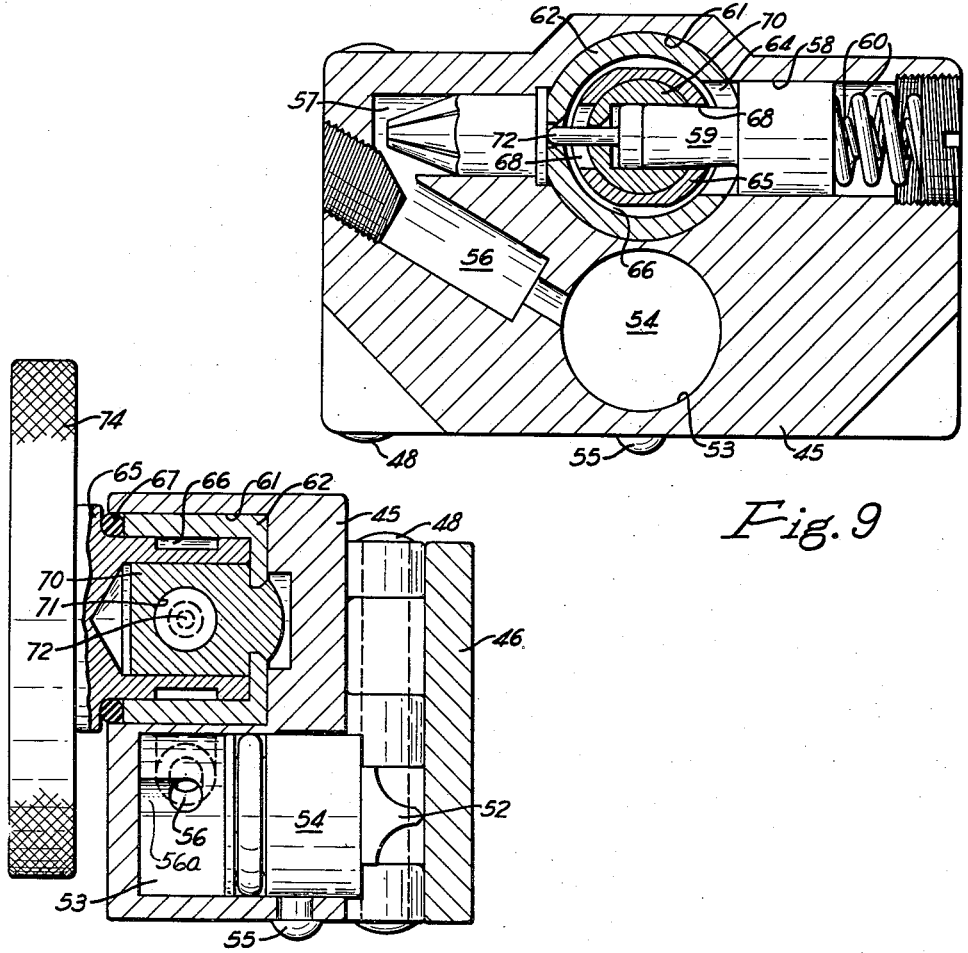
FIGS. 9 and 10 are sectional views similar to FIGS. 7 and 8, respectively, but showing the cutter after it has been fired.

Referring to FIGS. 1 to 4 of the drawings, a frame is formed from a metal block 1 and a metal base 2. At opposite ends of the block there are laterally spaced integral lugs 3 that project downward between upwardly projecting lugs 4 at the ends of the base. Each group of lugs is provided with a passage, in one of which a hinge pin 5 is permanently mounted and in the other of which there is a removable screw 6 that is threaded at one end. The space between the central portion of the base and the bottom of the block forms a rectangular slot 7, through which the webbing forming one or more harness straps 8 can extend. Straps are inserted in the slot by first removing screw 6 so that one end of the base can be swung away from the block to open one side of the slot for reception of the straps.

As shown in FIGS. 3 and 4, near one end of slot 7 the block 1 is provided with a recess 10 that extends more than the width of the slot. A cutting blade 11 is disposed in this recess with its cutting edge facing base 2. The blade is a little longer than the width of the slot, which is possible because the two lugs beneath the blade are provided with notches 12 that can receive the ends of the blade. The central portion of the blade is secured to the bottom of a piston 13 that extends up into a chamber 14 in the frame block. Ordinarily the piston and blade are held in their upper or retracted position by a shear pin 15 (FIG. 4) projecting inwardly from one side of recess 10 and engaging the front of the piston. The back or upper part of the piston is provided with a peripheral groove in which a sealing gasket 16 is disposed for engagement with the encircling side wall of the chamber.

The back part of the piston chamber is connected by a transverse passage 18 with one end of a cartridge chamber 19 that extends lengthwise of the blade beside the piston, as shown in FIG. 2. Inside the cartridge chamber there is a sleeve 20, the front portion of which is spaced from the side wall of the chamber and the front end of which is provided with notches 21 and engages a screw plug 22 that forms the front end of the chamber. The sleeve contains an explosive cartridge 23, and behind the sleeve there is another chamber 24 connected with it by a small central passage 25. The passage is large enough to receive a firing pin 26 mounted on the front end of a cuplike member 27 slidably mounted in chamber 24. Inside the cup there is a coil spring 28 that presses against a screw plug 29 in the outer end of chamber 24.

The spring and cup, which constitute spring-actuated means for driving the firing pin, normally are held in retracted position with the spring compressed by means of the inner end of a stop 31 (FIG. 3) slidably mounted in an opening 32 drilled in the frame block perpendicular to the front portion of firing pin chamber 24. The central part of the stop may be provided with a peripheral groove for receiving a sealing gasket 33 that also helps hold the stop in position. The inner end of the stop is notched to fit over the front end of the firing pin cup and thereby hold the pin back away from the cartridge. Secured to the outer end of the stop is a flexible line or lanyard 34, the outer end of which may carry a gripping ball or knob 35 or the like. The lanyard normally extends through a groove 36 in the top of the frame, and the ball is disposed in a recess 37 formed in one corner of the frame. The lanyard and ball are held in those positions by a channel-shape cover 38 that fits over the frame block and has inturned longitudinal edges that fit in shallow grooves 39 in the opposite sides of the block.

If it becomes necessary to use this cutting device, the parachutist can insert a finger in the recess 37, or in a similar one 40 at the opposite end of the frame, and easily pull the cover off the frame. All he has to do then is to pull on ball 35 to remove stop 31 from in front of the firing pin cup, as shown in FIG. 5, whereupon coil spring 28 will expand and drive the pin 26 forward against the cartridge to fire it. The expanding gases from the cartridge will drive the piston and blade toward the base of the frame and thereby cut the harness straps that are in the slot 7 to release the parachute from the man. All of this can be done very quickly and easily.

In the modification shown in the remaining figures of the drawings the general construction and operation is the same as just described, but there is a material difference in the mechanism for normally maintaining the spring-actuated means retracted and for releasing it when necessary. In this form of the invention there likewise is a frame body block 45 and a base 46 that form a strap-receiving slot 47. They are connected together by a hinge pin 48 and a removable screw 49. The block has a longitudinal recess 51 in one wall of the slot, in which a cutting blade 52 is disposed, and a chamber 53 that contains a piston 54 secured to the central part of the blade. A shear pin 55 normally holds the blade out of the slot. The upper end of the piston chamber is connected by a short channel 56a and passage 56 with the front end of a cartridge chamber 57. In line with this chamber at the opposite end of the block is another chamber 58, which slidably receives a hammer 59 that is urged forward by coil springs 60.

The cartridge and hammer chambers are connected by a cylindrical chamber 61 that has its axis at right angles to the first two chambers and also has an open end at the side of the block farthest from the base. Removably mounted in chamber 61 is a cup-like breechblock 62 that engages the rear end of the cartridge. The breechblock has a pair of diametrically spaced holes 63 and 64 concentric with chambers 57 and 58, respectively. The hammer projects through the second hole and into engagement with the side of a hollow stop 65 journaled in the breechblock. The hammer holds the stop in place by projecting into a peripheral groove 66 around the stop. The outer end of the stop overlies the breechblock, and a sealing ring 67 (FIG. 8) is disposed between them. The stop is provided with a pair of diametrically opposite holes 68, large enough to receive the hammer, which normally are held about half way between the breechblock holes by means of a flattened area of the breechblock bearing against the hammer. Fitting inside of the rotatable stop is a plug 70, the inner end of which is rigidly connected to the breechblock. The plug has a radial passage 71 through it in line with the breechblock holes, but normally closed by the encircling stop. A firing pin 72 is slidably mounted in the plug passage.

If it becomes necessary to use this device, a knob 74 rigidly mounted on the outer end of stop 65 is turned by the parachutist until the radial holes in the stop line up with passage 71 and the breechblock holes. At that instant the hammer springs forward and strikes the back of the firing pin to drive its front end out of the stop, through breechblock hole 63 and against the cartridge to detonate it, as shown in FIG. 9. Then, as shown in FIG. 10, the expanding gases drive the piston and blade across slot 47 to cut the harness webbing therein and release the parachute.

This cutter, as well as the first one described, can be attached to the clothing of the parachutist if desired by a cord 75 secured at one end to the cutter frame, as shown in FIG. 6.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A parachute harness strap cutter comprising a frame having a body and base with a strap-receiving slot between them extending through the frame and being closed at four sides, the body and base being detachably connected together beside said slot to permit the slot to be opened to admit a parachute harness strap, said body provided with a recess in one wall of the slot extending across the slot, a cutting blade disposed in said recess, the frame body being provided with a chamber behind and opening into said recess, a piston in said recess for driving said blade across the slot and against said base, the frame body also being provided with a cartridge chamber and a passage connecting it with said piston chamber at the inner end of the piston, a firing pin slidably mounted in the frame body behind said cartridge chamber, spring-actuated means for driving said pin ahead toward the cartridge chamber, and means normally maintaining the spring-actuated means retracted but manually movable to permit the latter to drive the firing pin.

2. A strap cutter according to claim 1, in which said body and base are hinged together at one side of said slot, and including manually removable means connecting said body and base together at the opposite side of the slot to permit the slot to be opened.

3. A parachute harness strap cutter comprising a frame having a body and base with a strap-receiving slot between them extending through the frame and being closed at four sides, the frame and body being detachably connected together beside said slot to permit the slot to be opened to admit a parachute harness strap, said body being provided with a recess in one wall of the slot extending across the slot, a cutting blade disposed in said recess, the frame body being provided with a chamber behind and opening into said recess, a piston in said recess for driving said blade across the slot and against said base, the frame body also being provided with a cartridge chamber and a passage connecting it with said piston chamber at the inner end of the piston, a firing pin slidably mounted in the frame body behind said cartridge chamber, spring-actuated means for driving said pin ahead toward the cartridge chamber, a rotatable stop surrounding said pin and journaled in the frame on an axis perpendicular to the axis of the pin, said stop being provided with a pair of diametrically opposite openings large enough to receive the pin and said spring-actuated means, the stop normally being positioned to hold said means retracted and spaced from said pin, and manually operable means for turning the stop to align its openings with the firing pin to permit said spring-actuated means to drive the pin through one of said openings.

4. A parachute harness strap cutter comprising a frame having a body and base with a strap-receiving slot between them extending through the frame and being closed at four sides, the frame and body being detachably connected together beside said slot to permit the slot to be opened to admit a parachute harness strap, said body being provided with a recess in one wall of the slot extending across the slot, a cutting blade disposed in said recess, the frame body being provided with a chamber behind and opening in to said recess, a piston in said recess for driving said blade across the slot and against said base, the frame body also being provided with a cartridge chamber and a passage connecting it with said piston chamber at the inner end of the piston, a firing pin slidably mounted in the frame body behind said cartridge chamber, spring-actuated means for driving said pin ahead toward the cartridge chamber, a hollow breechblock removably mounted in the frame behind said cartridge chamber and provided with a pair of openings therethrough in line with that chamber, one of said openings receiving the front end of said means, a hollow stop rotatably mounted in said breechblock and provided with a pair of diametrically opposite openings alignable with the breechblock openings, the stop normally being positioned to hold said means retracted, a stationary plug in said stop provided with a passage therethrough aligned with said breechblock openings, a firing pin slidably mounted in said plug passage, and manually operable means for turning the stop to align its openings with said breechblock and plug openings to permit said spring-actuated means to strike the firing pin and drive it toward said cartridge chamber.

5. A strap cutter according to claim 4, in which said stop is provided with a peripheral groove normally receiving the front end of said spring-actuated means.

6. A parachute harness strap cutter comprising a frame having a strap-receiving slot therethrough and a recess in one wall of the slot extending across the slot, a cutting blade disposed in said recess, the frame being provided with a chamber behind and opening into said recess, a piston in said recess for driving said blade against the opposite wall of the slot, the frame also being provided with a cartridge chamber and a passage connecting it with said piston chamber at the inner end of the piston, a firing pin slidably mounted in the frame behind said cartridge chamber, spring-actuated means for driving said pin ahead toward the cartridge chamber, a stop slidably mounted in the frame and holding said means retracted, flexible means for pulling the stop laterally away from said spring-actuated means to permit the latter to drive the firing pin ahead, and a manually removable cover frictionally engaging the frame and covering said flexible means.

7. A strap cutter according to claim 6, in which said flexible means is a cord with a pull knob on its outer end, and said frame is provided with an external recess receiving said knob while said cover is in place.

References Cited in the file of this patent

UNITED STATES PATENTS

| | | |
|---|---|---|
| 1,397,911 | Tossizza | Nov. 22, 1911 |
| 2,687,572 | Matthews | Aug. 31, 1954 |
| 2,716,813 | Smyres | Sept. 6, 1955 |